(12) United States Patent
Pystynen et al.

(10) Patent No.: US 6,178,428 B1
(45) Date of Patent: Jan. 23, 2001

(54) METHOD AND APPARATUS FOR ACCESSING A FILE THAT CAN BE CONCURRENTLY WRITTEN

(75) Inventors: Tuomas Pystynen, Helsinki (FI); Gregory Pongracz, Redwood City, CA (US)

(73) Assignee: Oracle Corporation, Redwood Shores, CA (US)

( * ) Notice: Under 35 U.S.C. 154(b), the term of this patent shall be extended for 0 days.

(21) Appl. No.: 08/961,741

(22) Filed: Oct. 31, 1997

(51) Int. Cl.[7] ................................................ G06F 12/00
(52) U.S. Cl. ..................... 707/205; 707/200; 707/201; 707/202; 707/203; 707/204
(58) Field of Search .................................. 707/200, 201, 707/202, 203, 205, 204, 10, 2, 3, 104; 705/39; 345/505; 380/4, 23, 24, 25, 54; 712/20, 203; 713/200; 382/239, 276, 310; 711/144; 709/231

(56) References Cited

U.S. PATENT DOCUMENTS

| | | | |
|---|---|---|---|
| 5,488,718 | * | 1/1996 | Tanaka et al. ............................ 707/1 |
| 5,850,507 | * | 12/1998 | Ngai et al. ............................. 714/16 |
| 5,926,821 | * | 7/1999 | Hirose et al. .......................... 707/202 |
| 6,081,812 | * | 6/2000 | Boggs et al. .......................... 707/202 |

OTHER PUBLICATIONS

IEEE publication, "Detecting data and schema changes in scientific documents" by Nabil Adam et al., Rutgers University, Newark, NJ 07102, pp. 160–170, May 2000.*

* cited by examiner

Primary Examiner—Thomas G. Black
Assistant Examiner—Diane D. Mizrahi
(74) Attorney, Agent, or Firm—Charles E. Gotlieb (57) ABSTRACT

A method and apparatus copies only the data that was in a computer file when the copying process began, allowing other processes to alter the file while it is being copied without introducing inconsistent data into the copy. The file is arranged into sections, with each section containing one or more blocks of data, with each block stored in the file with a serial number higher than the block stored before. The number of blocks in each section is read and stored, and the highest serial number is read and stored. As blocks are copied from a section of the source file into a destination file, the number of blocks in the section are counted, and the count is compared with the number of blocks that were in the section before the blocks were copied. Blocks that would cause the number of blocks in the section to exceed the number of blocks in the section before any blocks were copied are not copied to the destination file, avoiding new blocks added to the end of a section after the copying began. If any of the remaining blocks that would otherwise be copied into the destination file have a serial number greater than the highest serial number read before the blocks were copied, the destination file is discarded and the copying is repeated to avoid incorporating inconsistent data into the copy.

20 Claims, 4 Drawing Sheets

METHOD AND APPARATUS FOR ACCESSING A FILE THAT CAN BE CONCURRENTLY WRITTEN

RELATED APPLICATIONS

The subject matter of this application is related to application Ser. No. 08/962,539 entitled, "METHOD AND APPARATUS FOR RESTORING A PORTION OF A DATABASE" filed on Oct. 31, 1997 and now U.S. Pat. No. 5,991,772 by C. Gregory Doherty, Gregory Pongracz, William Bridge, Juan Loaiza and Mark Ramacher, application Ser. No. 08/962,087 entitled, "METHOD AND APPARATUS FOR IDENTIFYING FILES USED TO RESTORE A FILE" filed on Oct. 31, 1997 and now U.S. Pat. No. 6,073,128 by Gregory Pongracz, Steven Wertheimer and William Bridge, application Ser. No. 08/962,086 entitled, "METHOD AND APPARATUS FOR EFFICIENTLY BACKING UP FILES USING MULTIPLE COMPUTER SYSTEMS" filed on Oct. 31, 1997 now U.S. Pat. No. 6,003,044 by Gregory Pongracz, Steven Wertheimer and William Bridge, application Ser. No. 08/961,747 entitled, "METHOD AND APPARATUS FOR PRESERVING NON-CURRENT INFORMATION THAT CAN BE OVERWRITTEN IN A COMPUTER FILE" filed on Oct. 31, 1997 by Gregory Pongracz and Tuomas Pystynen now U.S. Pat. No. 5,946,700, each having the same assignee as this application and incorporated herein by reference in its entirety.

FIELD OF THE INVENTION

The present invention is related to accessing computer files and more specifically to accessing computer files that may be concurrently updated as they are being accessed.

BACKGROUND OF THE INVENTION

Computer systems store information in files. Sometimes, a file may need to be accessed, for example by reading it to duplicate it for archival or other purposes. The process of reading the file takes a finite amount of time. During this time, if other computer processes are actively updating the file, it is possible for a process to write to the file while file is being read. This can result in inconsistent data in the copy.

For example, after the first half of the file is read, assume another process writes data to the first half of the file already read and to the second half of the file not yet read. While copying continues, the new data written into the second half of the file will be read and copied, but the new data written into the first half of the file will not the read and copied. As a result, the copy of the file will have inconsistent data.

One possible solution to this problem is to shut down or suspend the processes that may write new information into the file during the period of time that the file is being copied. However, this possible solution may be unacceptable, because the interruption of these processes may inconvenience the users of the processes.

If the processes that update the file do not write to the file frequently, a different potential solution may be employed. The potential solution can detect the presence of inconsistent data in the file being read so that the copying process can be restarted. The file to be read may be arranged as blocks of data, with each block having its own unique block number. A storage area in the file to be read stores the highest current block number in use. If a new block is to be written to the file, the highest current block number is retrieved from storage and incremented. This incremented block number is then written back to the file as the new highest current block number in use, and the new block is written associated with this new block number. For example, the new block number may be written into a specific location within the block.

When the file is to be copied, the process that will read the file to be copied retrieves the current highest block number from storage in the file. The blocks in the file are then read from the file and written into the copy. During or after the copying process, the block numbers of each block read are compared to the highest current block number read before copying process began. If any block read has a number that exceeds the highest current block number stored before the copying process began, a new block has been written to the file after the copying process began, and the new block was read and written into the copy of the file, resulting in inconsistent data in the copy of the file. The copying process is therefore restarted to avoid the problem of inconsistent data in the file. This process may be repeated again and again if necessary until a complete copy is made without any inconsistent data.

While this solution prevents the problem of reading inconsistent data from a file, other problems are caused by the solution. First, re-copying the file may impact the performance of other processes that share the resources used to recopy the file. Re-copying impacts the performance of the storage device from which the file is read, the storage device onto which the copy of the file is written, and the processor copying the file. If the processes writing to the file write more than occasionally, the number of times copying is restarted can be substantial, significantly impacting the performance of the various storage devices and the processor. In addition, the copying process may be somewhat time sensitive. In such case, it may be desirable to complete the copying process as soon as possible after it begins.

As an example of a somewhat time-sensitive copying process, a user may desire backup copies of ten files. It may be desirable to ensure that all files are copied as near in time as possible. If some of the files are often written by other processes, it may be quite difficult to obtain a copy of all 10 files made the same, or approximately the same, time if the second potential solution is employed.

A system and apparatus are therefore needed that can allow a file that is being written to by other processes to be accessed without containing inconsistent data, while reducing the number of times the file must be re-accessed.

SUMMARY OF INVENTION

According to the present invention, a method and apparatus accesses a file that is arranged into two or more sections, with zero or more blocks in each section. The number of blocks in each section and the highest-numbered block in the file are received, for example by reading them from the file, as the file existed before any blocks of the file are copied. As the file is accessed, the number of blocks read from each section is compared with the number of blocks received for the section. Blocks read exceeding the number of blocks received for the section are discarded. For example, these blocks would not be introduced into any copy made from the file, eliminating from the copy any new blocks appended to the end of a section of the file after the copying process began. In addition, as each block is read from the file, the block number may be compared to the highest-numbered block received. If the block number exceeds the highest-numbered block, the block is new, and the reading process is restarted. If the file is being accessed to create a copy, the copy may be deleted and copying restarted due to a block in the file when the copy was started having been overwritten by the new block.

Because the block number is checked against the highest-numbered block, the reading process may be restarted, along with any use made of the information read, for example discarding copies of files that would otherwise contain inconsistent data. However, because new blocks appended to the end of a section after the copying process began are not read, the number of times the file must be accessed to ensure consistent data is reduced or eliminated.

DETAILED DESCRIPTION OF A PREFERRED EMBODIMENT

Figure 1:
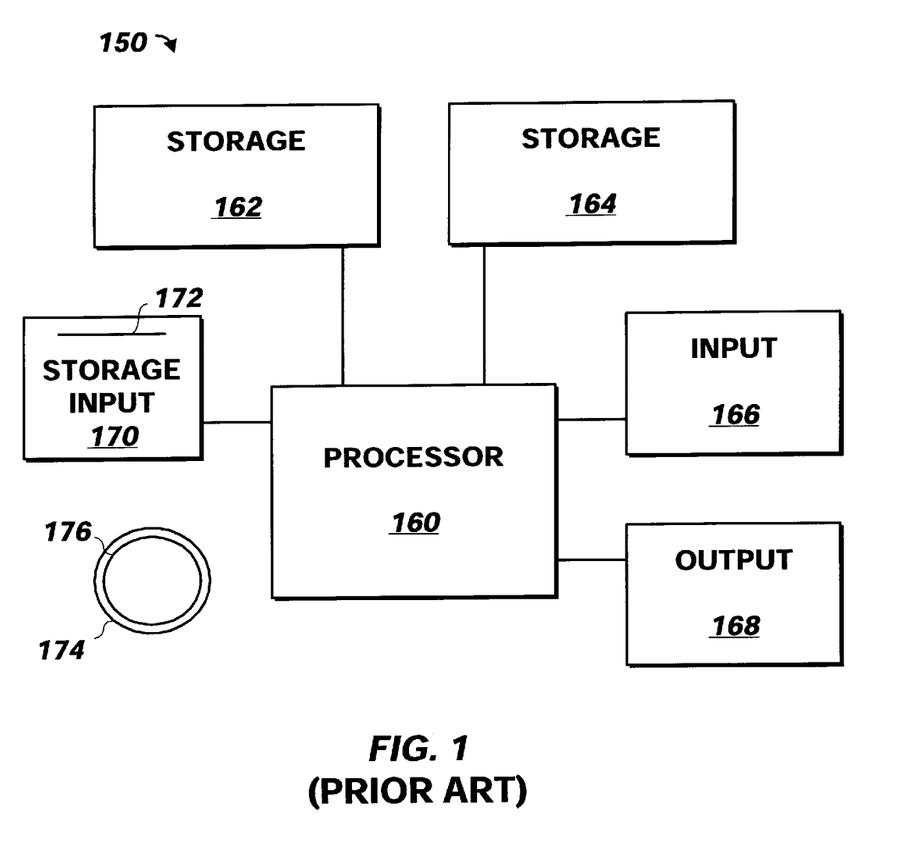
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Palo Alto, Calif., although other systems may be used.

Figure 2:
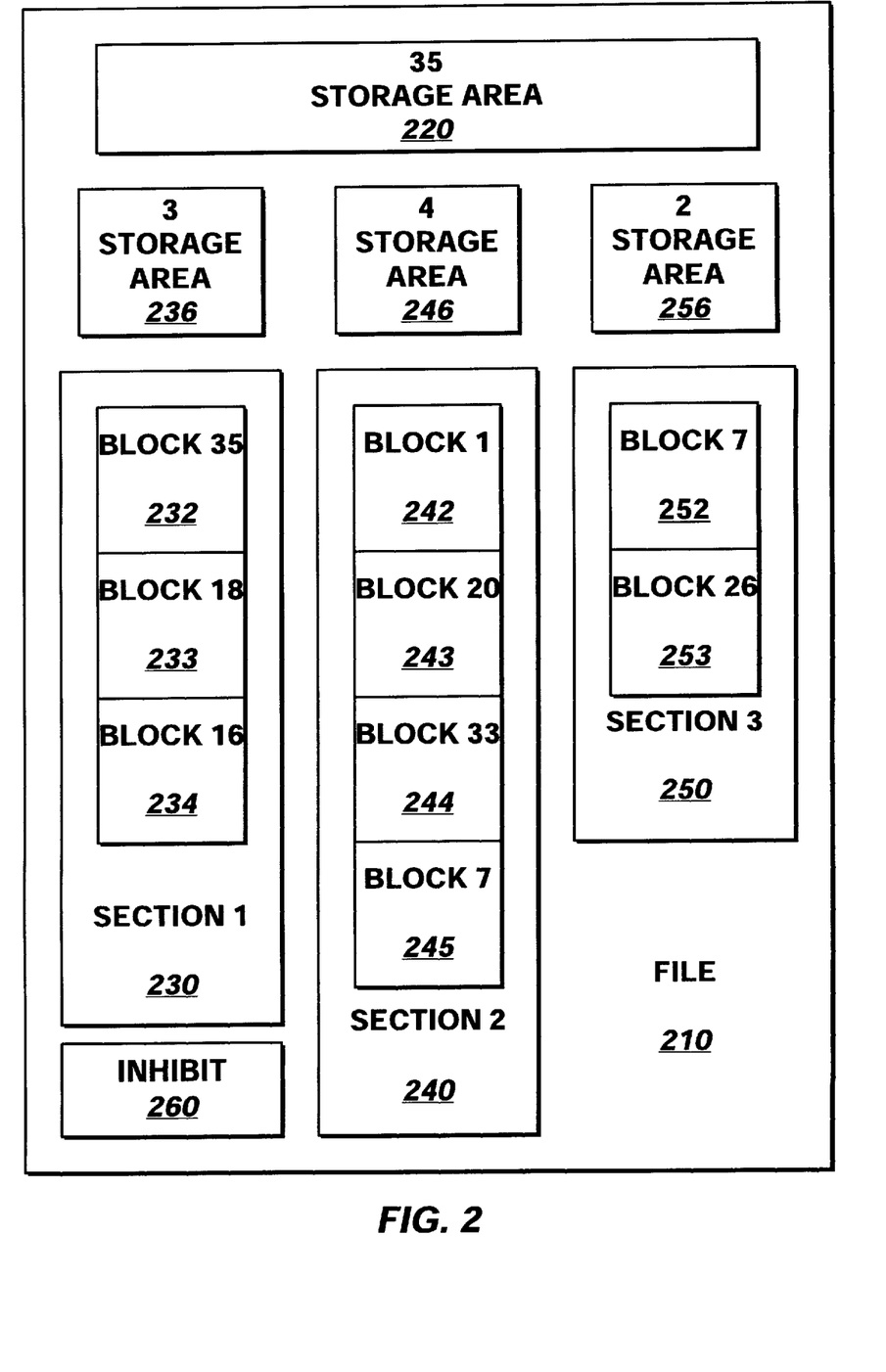
FIG. 2 is a block diagram of a file capable of being accessed according to one embodiment of the present invention.

Referring now to FIG. 2, one embodiment of a file capable of being accessed by the present invention is shown. As used herein, "access" can mean reading, writing or both. The information stored in file 210 is stored in several blocks 232, 233, 234, 242, 243, 244, 245, 252, 253. Each block 232, 233, 234, 242, 243, 244, 245, 252, 253 is stored in one section 230, 240 or 250. The blocks 232, 233, 234, 242, 243, 244, 245, 252, 253 may be physically stored in each of the sections 230, 240, 250, or logically stored in each of the sections 230, 240, 250, for example by using a table (not shown) that correlates each block 232, 233, 234, 242, 243, 244, 245, 252, 253 to one section 230, 240, 250. The blocks 232, 233, 234, 242, 243, 244, 245, 252, 253 stored in one section 230, 240, 250 may or may not be logically related to one another. As long as the process or processes that write the file 210 do so in a manner consistent with the other process or processes that will read the file 210, any arrangement of the blocks 232, 233, 234, 242, 243, 244, 245, 252, 253 into sections 230, 240, 250 may be used.

Each block 232, 233, 234, 242, 243, 244, 245, 252, 253 has a block number. For example, in FIG. 2, block 232 has a block number of 35. Storage area 220 stores the block number of the highest numbered block. In FIG. 2, block 232 is the highest numbered block and therefore the block number of block 232 is stored in storage area 220. Storage areas 236, 246, 256 store the number of blocks in each section 230, 240, 250, respectively. In the Figure, section 1 230 contains three blocks, and therefore the corresponding storage area 236 contains the number three. The other storage areas 246, 256 are similarly assigned values.

When a process desires to append a block to a section 230, 240, 250 of the file 210, the process retrieves the number of the highest numbered block from storage area 220. The process then increments the number and stores it back into storage area 220. The block is written to the section 230, 240 or 250, and the number of blocks stored in storage area 236, 246, 256 corresponding to the number of blocks in the section into which the new block was appended, is retrieved, incremented, and stored in the same storage area 236, 246 or 256. The block written to the section is written in such a manner that it will be read after the other blocks in the section, such as appending it to the end of a linked list of blocks in the section.

If a process wishes to replace an existing block 232, 233, 234, 242, 243, 244, 245, 252 or 253 with a new block, the process retrieves the number of the highest numbered block from storage area 220, increments it, stores the incremented number back into storage area 220, and associates the incremented number with the new block. The process then replaces the existing block 232, 233, 234, 242, 243, 244, 245, 252 or 253 with the new block.

If a process wishes to delete a block 232, 233, 234, 242, 243, 244, 245, 252 or 253 from the file 210, a blank block, that is, a block containing only a block number, is used to replace an existing block as described above. A table of block numbers corresponding to blank blocks, not shown, may be maintained so that processes that desire to write new blocks to the file 210 can replace blank blocks, if such blocks are available, as described above.

In this manner, the numbers in storage areas 236, 246, 256 are only increased or left the same, but are not decreased unless the apparatus of the present invention as described above is inhibited from reading the file as described below. This makes the numbers in storage areas 236, 246 and 256 to be "high water marks" for each of the sections, marking the largest number of valid records in each section.

In one embodiment, storage areas 220, 236, 246, 256 are stored in the file 210 that allows them to be consistently read. For example, they may be placed into a single block of the file 210. The present invention reads storage areas 220, 236, 246, 256 from the file 210 using a single disk access, preventing some of the storage areas 220, 236, 246, 256 from being changed by other processes while they are being read by the present invention.

In one embodiment, inhibit flag 260 is set to prevent the file 210 from being accessed for a short period of time. For example, the inhibit flag 260 may be set by a process that will consolidate blocks 232, 233, 234, 242, 243, 244, 245, 252, 253 that are not empty and adjust the numbers in storage areas 220, 236, 246, 256 according to the blocks 232, 233, 234, 242, 243, 244, 245, 252, 253 which remain. The process sets the inhibit flag 260, processes the file 210 and clears the inhibit flag 260.

Figure 3:
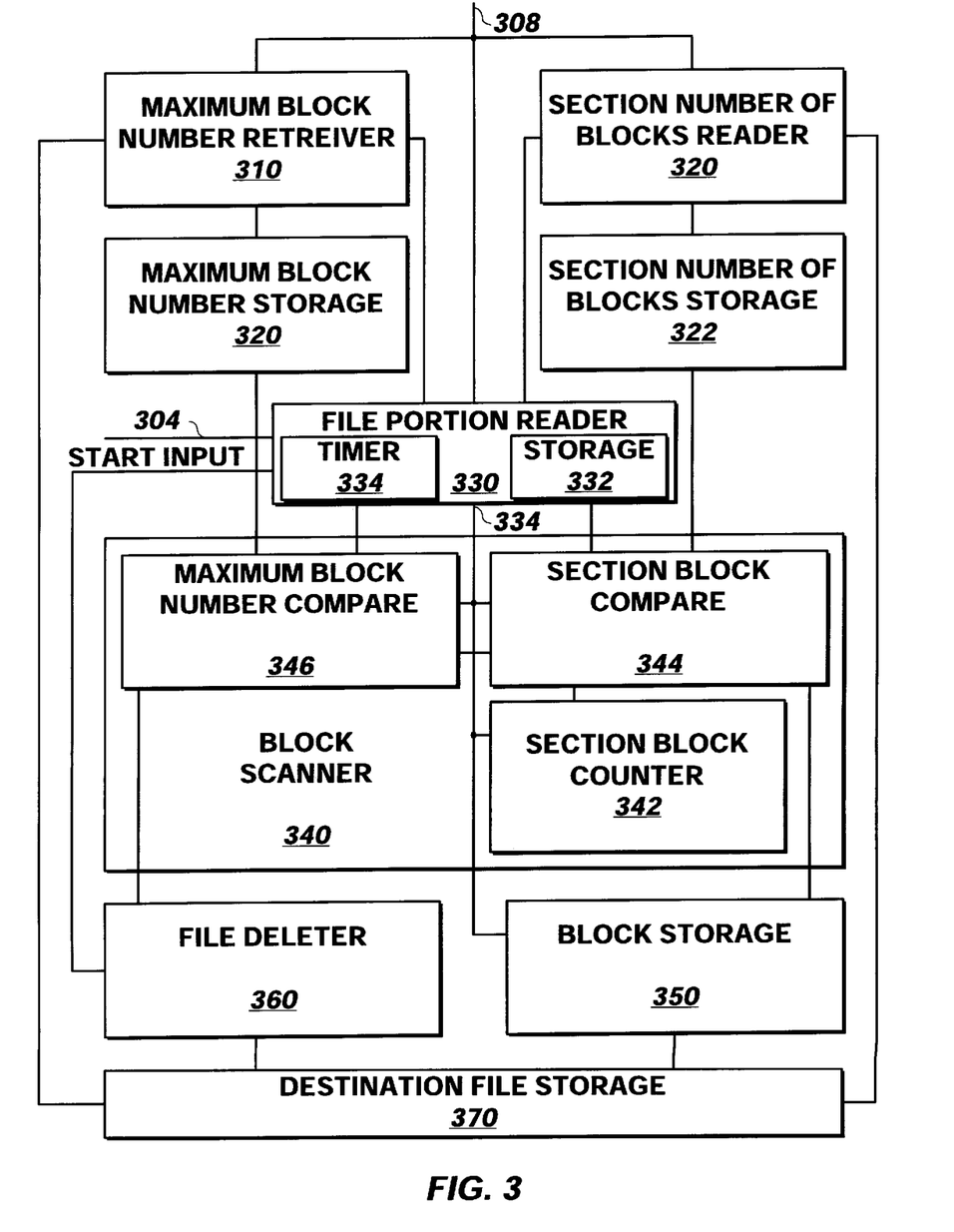
FIG. 3 is a block schematic diagram of a system for accessing a file without including inconsistent data according to one embodiment of the present invention.

Referring now to FIGS. 2 and 3, an apparatus for accessing the file 210 without obtaining inconsistent data is shown according to one embodiment of the present invention. The apparatus shown in FIG. 3 not only reads the file, but produces a copy, although the present invention can be used for any process that reads or otherwise accesses the file. Input 308 is coupled to read the file or files which the apparatus may be directed to copy. The name of the file is received at start input 304. File portion reader 330 reads inhibit flag 260 from the file and if inhibit flag 260 is set, file portion reader 330 sets a timer 334, such as a timer in an operating system (not shown) to wait a period of time, such as one second, and then restarts the copying process by rereading the inhibit flag. If inhibit flag 260 is not set, file portion reader 330 signals maximum block number retriever 310 to retrieve the maximum block number from storage area 220 in the file 210. Maximum block number retriever 310 retrieves this number and stores it in maximum block number storage 320, an area of storage such as memory or disk. File portion reader 330 signals section number of blocks reader 320 to retrieve the number of blocks in each section stored in storage areas 236, 246, 256. Section number of blocks reader 320 retrieves these numbers from storage areas 236, 246, 256 and stores these numbers in section number of blocks storage 322, an area of storage such as memory or disk. In one embodiment, maximum block number retriever 310 and section number of blocks reader 320 are a single element, which file portion reader 330 signals to read the maximum block number and the number of blocks in each section using a single disk access, to avoid any other process from writing these numbers during the time the apparatus of FIG. 3 reads them.

In one embodiment, maximum block number retriever 310 and section number of blocks reader 320 store into the file created in destination file storage 370 the maximum block number stored in maximum block number storage 320 and the number of blocks in each section stored in section number of blocks storage 322. Destination file storage 370 is any storage area such as memory, disk storage or tape storage that can hold the copy of the file 210. In addition, file portion reader 330 or block storage 350 stores inhibit flag 260 into the file copy into destination file storage 370. In another embodiment, these numbers are not stored in the copy of the file stored in destination file storage 370, for example where these numbers and flags are only used for the copying process.

File portion reader then begins to read the blocks 232, 233, 234, 242, 243, 244, 245, 252, 253 from the file 210. File portion reader 330 reads each block 232, 233, 234, 242, 243, 244, 245, 252 or 253 sequentially from the file 210. For example, block 232 is read first followed by block 233, block 234, block 242 and so on.

In one embodiment, file portion reader 330 retrieves several blocks 232, 233, 234, 242, 243, 244, 245, 252, 253 at the time from file 210 via input 308. Some or all of the blocks are stored in storage area 332. File portion reader 330 sends to output 334 one block at a time in the order read by file portion reader 330. Before file portion reader 330 sends to output 334 the first block from a section 230, 240, 250, file portion reader 330 signals section block compare 344, described below, that subsequent blocks are being transmitted from a specified section. In one embodiment, file portion reader 330 signals section block compare 344 by sending the number of the section from which subsequent blocks were copied.

As described in more detail below, block scanner 340 verifies that each of the blocks transmitted by file portion reader 330 at output 334 contain consistent data according to the numbers stored in maximum block number storage 320 and section number of blocks storage 322. Blocks in each section in excess of the high water mark for that section stored in section number of blocks storage 322 are not copied. Because all such blocks will have inconsistent data, avoiding reading such blocks will reduce the number of times the reading process must be restarted. However, if a block is read with a block number greater than the maximum block number stored in maximum block number storage 320, block scanner 340 directs the apparatus of FIG. 3 to restart the read and copy production procedure described above. In one embodiment, block scanner 340 contains section block counter 342, section block compare 344, and a maximum block number compare 346, described below.

Section block counter 342 counts the number of blocks it receives from output 334 of file portion reader 330. As described below, section block counter is directed by section block compare 344 to reset to zero each time the block it receives from file portion reader 330 is from a new section. This allows section block counter 342 to maintain the number of blocks transmitted by file portion reader 330 that originated from the current section. Section block counter 342 provides the number of blocks to section block compare 344 for use as described below.

Section block compare 344 compares the number of blocks counted by section block counter 342 with the number of blocks for the section from which the block transmitted at output 334 originated, as stored in section number of blocks storage 322. As described above, section block compare 344 receives from file portion reader 330 the number of the section from which subsequent blocks transmitted at output 334 originated. Section block compare 344 uses the section number as an index to section number of blocks storage 322 to compare the proper high water mark with the number of blocks counted by section block counter 342.

In one embodiment, block storage 350 receives each block from file portion reader 330 and stores the block in block storage 350. If the number of blocks counted by section block counter 342 exceeds the number of blocks for the section stored in section number of blocks storage 322, section block compare 344 directs block storage 350 to discard the block it stores. Otherwise, section block compare 344 directs block storage 350 to store the block in destination file storage 370 in the same order as it was received, to match the order of the source file at input 308.

In another embodiment of the present invention, the file is not copied, but instead processed using conventional data processing techniques. In such embodiment, destination file storage 370 may be used as a storage area for the apparatus which processes the information from the file, or replaced by an apparatus which processes the information from the file received via block storage 350 and restarts processing if it receives a signal from file deleter 360.

In another embodiment of the present invention, the block transmitted by file portion reader 330 at output 334 is stored directly into destination file storage 370, and block storage 350 is unused. Section block compare 344 signals file portion reader 330 if the section block counter 342 is equal to be corresponding number of blocks in section number of blocks storage 322. File portion reader 330 responds to this signal by discarding any additional blocks from that section in storage 332 or otherwise received from the file and retrieves additional blocks from the next section in the file 210. Thus, only a number of blocks up to the high water mark stored in section number of blocks storage 322 are stored in destination file storage 370.

When section block compare 344 receives indication from file portion reader 330 that subsequent blocks transmitted at output 334 are from a section different from that of the prior block, section block compare 344 signals section block counter 342 to reset to a value of '0'.

File portion reader 330 transmits the block number of each block transmitted at output 334. If the block number is a part of the block, file portion reader 330 transmits the block number as part of the block. If the block number is not part of the block, file portion reader 330 retrieves the section number from the file 210 or elsewhere at input 308 with each block, and transmits the block number with the block at output 334. Maximum block number compare 346 verifies that the block number of each of the blocks transmitted by file portion reader 330 at output 334 contains a valid block number. Maximum block number compare performs this validation by comparing the block number of each block transmitted at output 334 with the maximum block number stored in maximum block number storage 320. If the block number of a block exceeds the maximum block number stored in maximum block number storage 320, maximum block number compare 346 signals file portion reader 330 to restart the read and copy process. Maximum block number compare 346 also signals section block compare 344 that the process is being restarted. In one embodiment, maximum block number compare 346 also signals file deleter 360 which deletes the partially written file in destination file storage 370.

In one embodiment, file portion reader 330 periodically checks inhibit flag 260. If inhibit flag 260 is set, file portion reader signals file deleter to delete the file in destination file storage 370, and the file portion reader 330 restarts the read and copy process.

Figure 4:
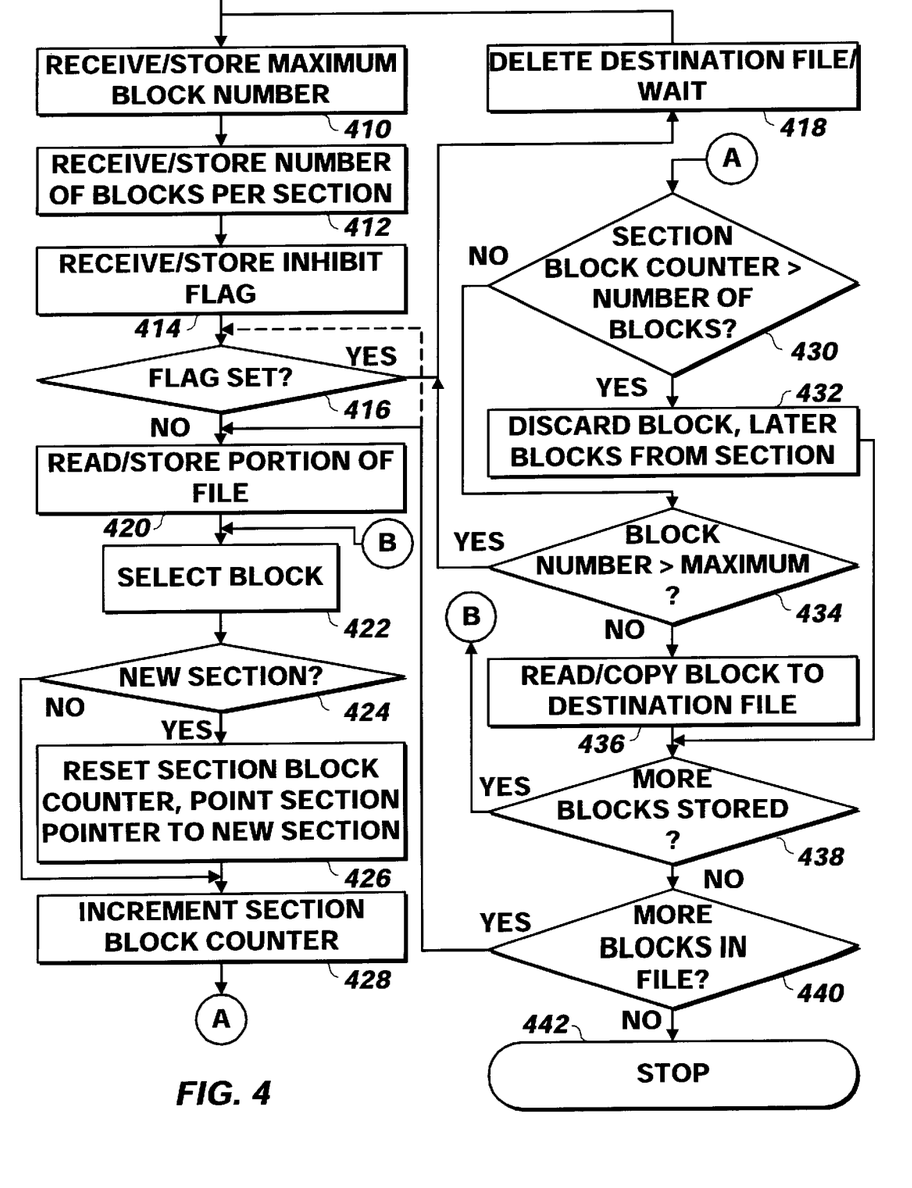
FIG. 4 is a flowchart illustrating a method of accessing a file without including inconsistent data according to one embodiment of the present invention.

Referring now to FIG. 4, a method of accessing a file without including inconsistent data is shown according to one embodiment of the present invention. In one embodiment, the file is copied in addition to being read, although the present invention may be applied to only reading or otherwise accessing the file. A maximum block number, number of blocks per section and inhibit flag are received 410, 412, 414. In one embodiment, the maximum block number, number of blocks per section, and the inhibit flag are stored in the destination file 410, 412, 414. If the inhibit flag is set 416, the method will delete 418 any file it has created, and wait 418 a certain period, such as one second, and restart the method at step 410. If the inhibit flag is not set, a portion, such as one or more blocks, of the file is read 420 as described above.

A block read in step 420 is selected 422. If the block selected in step 422 is in a new section 424, a section block counter is reset and a section pointer is pointed to a new section 426, for example, by setting its value to the number or other indicator of the section. As described below, the section block counter counts the number of blocks selected in step 422 from a single section. The section pointer is used to identify the current section within the number of blocks per section received in step 412.

The section block counter is incremented 428. If the section block counter is greater than the number of blocks for the section received in step 412, the block is discarded 430, 432. In one embodiment, step 432 also discards all the later blocks from the section that were read in step 420. If the section block counter is not greater than the number of the blocks for the section received in step 412, the block number of the block selected in step 422 is checked 434 to determine if the block number of the block is greater than the maximum block number received in step 410. If the maximum block number received in step 410 is exceeded by the block selected in step 422, the file is deleted, and after an optional short delay such as one second, the method repeats 418 at step 410. Otherwise, the block selected in step 422 is copied to the destination file 436. In another embodiment of the present invention, the file is not copied, to another file and step 436 is replaced by a step which processes some or all of the information read, and step 418 is replaced by discarding the information read. If the portion of the file read and stored in step 420 contains more blocks 438, the method repeats at step 422. If there are no more blocks available from those read and stored in step 420, if there are more blocks in the file 440, the method continues at step 420 in one embodiment, and at step 416 in another embodiment, as shown by the dashed line in the figure. Otherwise, the method terminates 442.

What is claimed is:

1. An apparatus for accessing in a file comprising a plurality of sections, at least one block of data from each of the plurality of sections, the method comprising:

a maximum block number retriever having an input operatively coupled to receive a number of a block in the file, the maximum block number retriever for storing the number received at the maximum block number retriever input and for providing at an output the number received at the maximum block number retriever input;

a section number of blocks reader having a first input operatively coupled to receive a plurality of numbers, each of the numbers representing a number of blocks stored in one of the sections of the file, a second input operatively coupled to receive an indicator of a section, the section number of blocks reader for storing the plurality of numbers received at the section number of blocks reader first input and for providing at an output the number of blocks in the section corresponding to the indicator received at the second input; and a block scanner having an input/output operatively coupled to access a plurality of blocks in the file, a first input coupled to the maximum block number retriever output and a second input coupled to the section number of blocks reader output, the block scanner for, for each of at least one section, responsive to the number received at the block scanner first input, processing a first number of the blocks accessed at the block scanner input/output corresponding to the number received at the block scanner third input in a first manner, and for processing a second number of the blocks accessed at the block scanner input/output in a second manner different from the first manner.

2. The apparatus of claim 1 wherein the block scanner reads the plurality of the blocks in the file at the first input/output.

3. The apparatus of claim 2, wherein the block scanner comprises:
a section block counter having an input coupled to the block scanner input, the section block counter for counting a number of a plurality of the blocks received at the section block counter input and providing an identifier of said number of blocks at an output; and
a section block compare having a first input coupled to the block scanner input/output and a second input coupled to the section block counter output for receiving the number of blocks, the section block compare for identifying a section containing at least one block received at the block scanner input/output, providing at a first output coupled to the section number of blocks second input an identifier of the section identified, receiving at a third input coupled to the section number of blocks output a number of blocks for the section; comparing the count received at the second section block compare second input with the number received at the section block compare third input to produce a result, and providing at an output an indication of the result.

4. The apparatus of claim 2, wherein:
each block received at the block scanner input/output has a block number;
the block scanner additionally comprises a maximum block number compare having a first input operatively coupled to receive at least one block number and a second input coupled to the block scanner first input to receive a boundary definition, the maximum block number compare for providing at an output having a first state and a second state responsive to a block number received at the block scanner input/output exceeding a boundary condition corresponding to the boundary definition received at the block scanner first input; and
the block scanner processes the blocks responsive to the maximum block number compare output in the first state.

5. The apparatus of claim 4, wherein processing in the first manner comprises storing into an output file, and processing in the second manner comprises not storing into the output file.

6. The apparatus of claim 5, wherein the block scanner comprises an output for providing at least zero of the blocks received at the block scanner input/output, the apparatus additionally comprising:
a file storage having an input/output coupled to the block scanner output, the file storage for storing the output file; and
a file deleter having an output coupled to the file storage input/output and an input coupled to the maximum block number compare output, the file deleter for deleting the file responsive to the file deleter input in the second state.

7. A computer program product comprising a computer useable medium having computer readable program code embodied therein for accessing in a file comprising a plurality of sections, each of the sections comprising at least one block of data, the computer program product comprising:
computer readable program code devices configured to cause a computer to read a first number corresponding to a highest numbered block in the file;
computer readable program code devices configured to cause a computer to, for each of a plurality of the sections, read a second number corresponding to a number of the blocks in said section; and
computer readable program code devices configured to cause a computer to, for each of a plurality of the sections, access at least a number of the blocks corresponding to the second number.

8. The computer program product of claim 7 additionally comprising computer readable program code devices configured to cause a computer to, for each of a plurality of the sections:
process in a first manner a number of blocks corresponding to the second number; and
process in a second manner a number of blocks in excess of the second number.

9. The computer program product of claim 8 wherein the computer readable program code devices configured to cause a computer to process in the first manner comprise computer readable program code devices configured to cause a computer to write to a first file.

10. The computer program product of claim 9 wherein the computer readable program code devices configured to cause a computer to process in the second manner comprises computer readable program code devices configured to cause a computer to at least one selected from discard and write to a second file different from the first file.

11. The computer program product of claim 8, wherein each block has a number, and the computer program product additionally comprises:
computer readable program code devices configured to cause a computer to read at least one block number corresponding to a block accessed; and
computer readable program code devices configured to cause a computer to, responsive to the block number read in excess of the first number, repeat the operation of at least a portion of the computer program product.

12. The computer program product of claim 8 additionally comprising:
computer readable program code devices configured to cause a computer to read an inhibit flag having a first state and a second state; and
computer readable program code devices configured to cause a computer to, responsive to the inhibit flag in the first state, wait for a period of time.

13. A method of accessing a file comprising a plurality of blocks of data, at least one block comprising an identifier of the block, the method comprising:
reading data describing the file;
reading at least one of the plurality of blocks of data; and
detecting a change in the file responsive to the reading data step and the reading at least one of the plurality of blocks of data step.

14. The method of claim 13, wherein
the reading the data describing the file comprises, for each of a plurality of sections of the file, reading a number corresponding to a number of the blocks in said section.

15. The method of claim 14 comprising the additional steps of, for each of a plurality of the sections:
processing in a first manner a number of blocks corresponding to the number read; and
processing in a second manner blocks in excess of the number read.

16. The method of claim 15 wherein processing in the first manner comprises writing to a first file.

17. The method of claim 16 wherein processing in the second manner comprises at least one selected from discarding and writing to a second file different from the first file.

18. The method of claim 15 comprising the additional step of:

reading an inhibit flag having a first state and a second state; and responsive to the inhibit flag in the first state, waiting for a period of time.

19. The method of claim 13, wherein:

the block identifier comprises a number;

the reading the data describing the file comprises reading a number corresponding to a number of blocks in the file;

the reading at least one of the plurality of blocks of data comprises reading at least one block number corresponding to a block read; and responsive to the block number read in excess of the number corresponding to the number of blocks in the file repeating the method.

20. A computer program product comprising a computer useable medium having computer readable program code embodied therein for accessing a file comprising a plurality of blocks of data, at least one block comprising an identifier of the block, the computer program product comprising:

the computer readable program code devices configured to cause a computer to read data describing the file;

the computer readable program code devices configured to cause a computer to read at least one of the plurality of blocks of data; and the computer readable program code devices configured to cause a computer to detect a change in the file responsive to the computer readable program code devices configured to cause a computer to read the data and the computer readable program code devices configured to cause a computer to read the plurality of blocks of data.

* * * * *